May 23, 1939. J. DE MOOY 2,159,655

PLATE FASTENING DEVICE

Original Filed Jan. 13, 1937

JOHN DE MOOY
INVENTOR

BY *John V. Renfer*
ATTORNEY

Patented May 23, 1939

2,159,655

UNITED STATES PATENT OFFICE 2,159,655

PLATE FASTENING DEVICE

John De Mooy, Shaker Heights, Ohio, assignor to The Cleveland Pneumatic Tool Company, Cleveland, Ohio, a corporation of Ohio Application January 13, 1937, Serial No. 120,350
Renewed December 4, 1937

4 Claims. (Cl. 85—5)

This invention relates broadly to a plate fastening device, but more particularly to an improved fastener for securing together perforated plates or the like preparatory to the riveting thereof.

One object of this invention is to produce an improved fastener of the type disclosed in my copending application Serial No. 65,439, filed February 24, 1936.

Another object of this invention is to produce a plate fastener which may readily be applied to and removed from the work, and constituting a simple assembly which is strong, durable and efficient.

Another object of this invention is to produce an improved fastener capable of securing plates together as well as assuring the perfect alignment of the rivet holes provided through the plates.

Other objects more or less ancillary to the foregoing reside in the specific construction and aggroupment of the elements peculiar to this structure, as will become apparent from a more complete examination of this specification.

In the drawing which illustrates the invention:

Figure 1:
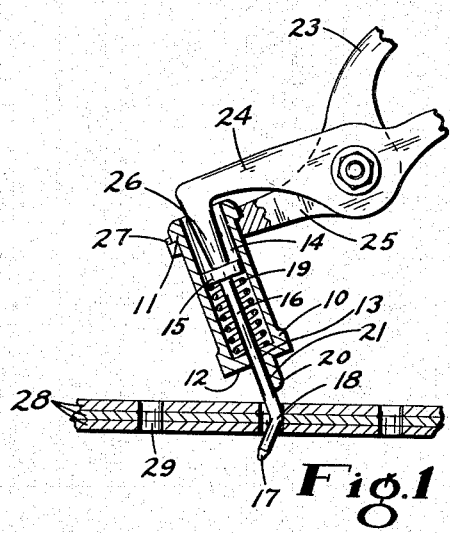
Fig. 1 is an elevational view partly in section of the fastener together with a portion of the tool with which the fastener is applied to and removed from the work. In this view, the fastener is shown in the position assumed during the first step of its application to the work.
Figure 4:
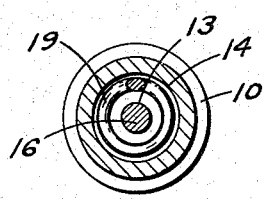
Fig. 4 is an enlarged cross sectional view taken in a plane indicated by line 4—4 in Fig. 2.
Figure 5:
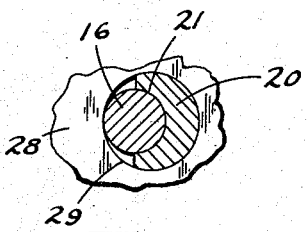
Fig. 5 is an enlarged cross sectional view taken in a plane indicated by line 5—5 in Fig. 2.
Figure 2:
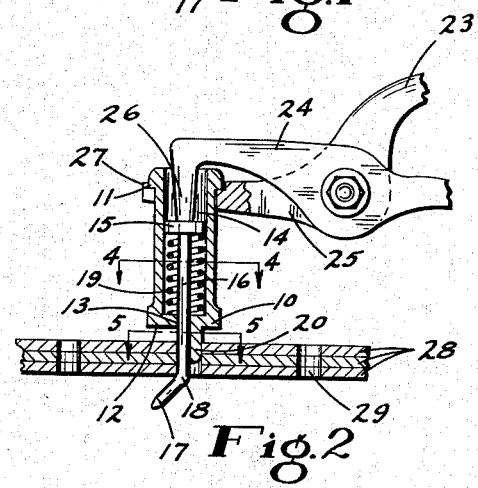
Fig. 2 is a view similar to Fig. 1 illustrating the position assumed by the fastener during the second step of its application to the work.
Figure 3:
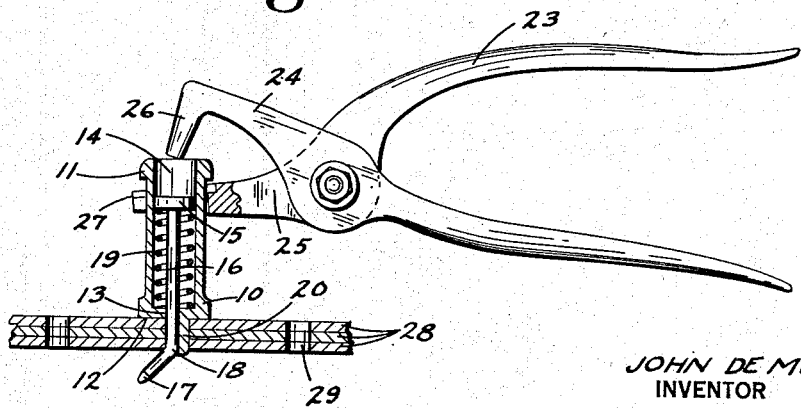
Fig. 3 is a complete view of the tool together with the fastener in operative position.

Referring to the drawing in which like symbols designate corresponding parts throughout the several views, 10 represents a cylindrical housing having an annular shoulder 11 and a flat end wall 12. Extending through the housing 10, there is a bore 13 which is, for a major portion of its length, enlarged to form a relatively deep counterbore 14.

Within the counterbore 14 is slidably mounted the head 15 of a pin 16 which extends exteriorly of the housing 10 through the bore 13. This pin is formed of a uniform diameter and has one end pointed as at 17 and an adjacent end portion 18 bent at an obtuse angle with respect to the rest of the pin. This bent end portion of the pin is constantly urged toward the end wall 12 of the housing 10 by the effort of a compression spring 19 interposed between the head 15 and the bottom of the counterbore 14.

Depending from the lower end wall 12 of the housing 10, there is a straight stem 20 formed of a partly circular cross section. The stem is provided with a longitudinally disposed groove 21 within which is slidably mounted the pin 16.

Used in connection with the fastener above described, there is provided a plier like tool 23 comprising a duality of movable jaws 24 and 25. The upper jaw 24 has its substantially cylindrical end 26 bent at right angles for penetration into the counterbore 14 where it is capable of engagement with the head 15 of the pin 16. The lower jaw 25 is open to form a U-shaped jaw provided with a partly annular step 27 engageable with the annular shoulder 11 of the housing 10.

Referring to the operation of the device, let it be assumed that the work to be riveted consists of three plates 28, having rivet holes 29 formed therethrough, and that the device or fastener is positioned between the jaws of the tool 23 as shown in Fig. 1. By manual pressure exerted on the hand grips of the tool, the jaws thereof are moved toward each other to compress the spring 19 and thereby cause the bent end portion 18 of the pin 16 to move away from the housing and its stem 20. Thereafter the pointed end 17 of the pin is inserted through the rivet holes 29 of the plates 28 by positioning the fastener substantially as shown in Fig. 1, and causing the penetration of the pin through the plates until the bent end portion 18 has passed through the work. Thereafter, the fastener is moved into vertical position and the manual pressure exerted on the hand grips of the tool 23 is gradually released to cause, due to the effort of the compression spring 19, the penetration of the stem 20 into the holes 29.

The stem 20 is formed of a partly circular or crescent-shaped like cross section having the circular cross section of the pin partly disposed within the groove 21 in line contact with and encompassed within the circle partly defined by the external wall of the stem, permitting thereby the pin and the stem to engage the inner wall of the holes 29 for maintaining them in coaxial alignment. With this disposition of the pin and stem, it is evident that the pin is only capable of line contact with the inner wall of the holes 29, thus permitting a free slidable movement of the pin without frictional interference with the inner wall of the holes 29. The extent of the peripheral wall of the stem 20 is materially greater than one half of the corresponding wall of the holes 29, thus forming an adequate guiding surface for maintaining the holes in coaxial alignment, while the groove 21 which is of a depth substantially equal to one half of the diameter of the pin 16, affords an adequate guide for the pin.

When the manual pressure applied on the hand grips of the tool is finally released, the bent end portion of the pin 15, due to the action of the compression spring 19, is urged upwardly toward the housing 10, thus causing the forcible clamping of the plates between the inner corner of the bent end portion 18 and the lower wall 12 of the housing.

After the plates have been riveted sufficiently to hold them together against relative movement, the fastener may be removed from the plates by again applying the tool 23 to the device for compressing the spring 19 until the stem 20 is moved out of the holes 29. Thereafter the fastener may again be tilted as shown in Fig. 1, and the pin removed from the work.

I claim:

1. A device for provisionally securing perforated plate-like elements with their perforations in vertical alignment preparatory to riveting comprising a housing, a pin of uniform diameter and less than the diameter of the rivet hole slidable within said housing having an end portion bent to an obtuse angle with respect to the rest of the pin and protruding from said housing for insertion in rivet holes provided through the work, a straight stem depending from said housing and having a semi-annular long groove of the same radius as the pin and partly surrounding said pin in slidable engagement therewith, said stem being of a diameter substantially equal to that of the rivet hole and insertable into the rivet holes for engagement with the internal wall thereof and cooperating with said pin for maintaining said holes in coaxial alignment, and spring means operatively associated with said housing and pin for effecting the clamping of the work between said housing and the bent end portion of said pin.

2. A device for provisionally securing perforated plate-like elements with their perforations in coaxial alignment preparatory to riveting comprising a housing, a pin of a uniform diameter smaller than that of the perforations in said plate-like elements slidable within said housing, said pin having an end portion bent to an obtuse angle with respect to the rest of the pin and protruding from said housing for insertion in said perforations, a straight stem depending from said housing, a guiding groove for said pin longitudinally disposed on said stem, the depth of said groove being substantially equal to one half of the diameter of said pin, said stem being insertable into said perforations to form with said pin an assembly of a cross sectional diameter substantially equal to that of said perforations for maintaining said perforations in coaxial alignment, and spring means operatively associated with said housing and pin for effecting the clamping of said plate-like elements between said housing and the bent end portion of said pin.

3. A device for provisionally securing perforated plate-like elements with their perforations in coaxial alignment preparatory to riveting comprising a housing, a pin slidable within said housing having a uniform diameter smaller than that of said perforations, said pin having an end portion bent at an obtuse angle with respect to the rest of the pin and protruding from said housing for insertion in said perforations, a straight stem depending from said housing formed with a cross section defining a portion of a circle encompassing the cross section of said pin, said circle having a diameter substantially equal to that of said perforations, said stem being insertable into said perforations for assuring the coaxial alignment thereof, and spring means operatively associated with said housing and pin for effecting the clamping of said plate-like elements between said housing and the bent end portion of said pin.

4. A device for provisionally securing perforated plate-like elements with their perforations in coaxial alignment preparatory to riveting comprising a housing, a pin slidable within said housing having an end portion bent to an obtuse angle with respect to the rest of said pin and protruding from said housing for insertion in said perforations, said pin being of a uniform diameter smaller than that of said perforations, a straight stem depending from said housing insertable into said perforations beside said pin and forming therewith an assembly of a cross sectional extend substantially equal to the diameter of said perforations for maintaining said perforations in coaxial alignment, and spring means operatively associated with said housing and pin effecting the clamping of said plate-like elements between said housing and the bent end portion of said pin.

JOHN DE MOOY.